(12) United States Patent
Walker

(10) Patent No.: US 12,325,515 B2
(45) Date of Patent: Jun. 10, 2025

(54) WINGLESS VTOL FLYING LAND VEHICLE

(71) Applicant: William Walker, Mullhyttan (SE)

(72) Inventor: William Walker, Mullhyttan (SE)

( * ) Notice: Subject to any disclaimer, the term of this patent is extended or adjusted under 35 U.S.C. 154(b) by 0 days.

(21) Appl. No.: 18/674,927

(22) Filed: May 27, 2024

(65) Prior Publication Data

US 2024/0308653 A1 Sep. 19, 2024

Related U.S. Application Data

(63) Continuation of application No. 17/963,192, filed on Oct. 11, 2022, now Pat. No. 11,993,366.

(60) Provisional application No. 63/254,404, filed on Oct. 11, 2021.

(51) Int. Cl.
| | |
|---|---|
| *B64C 29/00* | (2006.01) |
| *B60F 5/00* | (2006.01) |
| *B64C 9/02* | (2006.01) |
| *B64C 9/14* | (2006.01) |
| *B64C 25/36* | (2006.01) |
| *B64C 37/00* | (2006.01) |

(52) U.S. Cl.
CPC ............ *B64C 29/0008* (2013.01); *B60F 5/00* (2013.01); *B64C 9/02* (2013.01); *B64C 9/14* (2013.01); *B64C 25/36* (2013.01); *B64C 37/00* (2013.01)

(58) Field of Classification Search
CPC ......... B64C 29/0008; B64C 9/02; B64C 9/14; B64C 25/36; B64C 37/00; B64C 35/008; B60F 5/00
See application file for complete search history.

(56) References Cited

U.S. PATENT DOCUMENTS

| | | | | |
|---|---|---|---|---|
| 2,561,291 A * | 7/1951 | Rethorst | ................. | B64C 37/00 244/50 |
| 2,989,269 A * | 6/1961 | Le Bel | ................. | B64C 29/0033 244/12.3 |
| 3,159,361 A * | 12/1964 | Weiland | ................... | B60V 1/14 180/117 |
| 5,145,129 A * | 9/1992 | Gebhard | ................. | B64C 29/00 244/45 R |
| 6,719,079 B2 * | 4/2004 | Jones | ....................... | B60V 1/08 180/126 |
| 2015/0102155 A1 * | 4/2015 | Krastev | .................. | B60K 16/00 244/2 |

* cited by examiner

*Primary Examiner* — Joshua J Michener
*Assistant Examiner* — Katherine June Walter
(74) *Attorney, Agent, or Firm* — Jeffrey Pearce

(57) ABSTRACT

A wingless vertical take-off and landing (VTOL) vehicle has a main body including airfoil sections on either side of a central module in which a load may be carried. Articulated forward thrust systems are mounted on a leading edge of the main body and lateral members are located on either side of the main body and form winglets. At least one rear vertical-thrust system may also be provided and, in one embodiment, is mounted in an aperture aft of the central module. The forward thrust systems transition between a vertical flight configuration and a horizontal flight configuration. The lateral members are configured as both vortex-damping members and also to channel backwash from the forward thrust systems over the airfoil formed by the main body.

10 Claims, 5 Drawing Sheets

WINGLESS VTOL FLYING LAND VEHICLE

REFERENCE TO RELATED APPLICATIONS

This application is a continuation of U.S. patent application Ser. No. 17/963,192 (issued as U.S. Pat. No. 11,993,366 on 28 May 2024), claimed priority of International Patent Application PCT/IB2022/059712, filed 11 Oct. 2022, which in turn claimed priority of U.S. Provisional Patent Application No. 63/254,404, filed 11 Oct. 2021. This application claims priority of all three of these patent applications.

TECHNICAL FIELD

This invention relates to vehicles that can both fly and operate on land.

BACKGROUND ART

People have been seeking greater mobility since even before the invention of the wheel, and ever since Karl Benz patented an automobile and the Wright Flyer became airborne people have dreamed of a way to combine both land and air transportation capability in a single vehicle. Especially with the development and widespread ability of lightweight but strong materials and high-efficiency engines, more and more attempts to realize this dream are being made. There are many prior art solutions, which generally fall into one of a few categories.

Perhaps the most obvious attempted solution for a combined land/air vehicle is simply a form of aircraft with stowable wings, which may be fixed or rotary. One of the many examples of a fixed-wing design that has been successfully test-flown is the AirCar created by the Slovakian company Klein Vision; an example of a rotary-wing air/land vehicle is produced as the Liberty by the Dutch company Pal-V. One obvious shortcoming of these designs is that the vehicle must have space to store the wings during ground operation, which either takes up space or increases drag, or both. Moreover, the use of extended wings requires an available runway for take-off and landing. Another obvious weakness is the need for and reliance on a mechanism to enable the wings to be stowed and deployed. This mechanism, and the wings themselves, represent such a dangerous single point of failure that, for example, the Slovakian AirCar incorporates a ballistic parachute.

Wingless aircraft using the principle of a "lifting body" have been known for at least 100 years and were the subject of intense study and experimentation in the decades leading up to the design of the American Space Shuttle. The M2-F3 is an example of such a wingless lifting body, in which the fuselage itself is designed to provide lift in forward flight, with no or at most stub wings. An example of a lifting body intended for dual air and land operation is shown in U.S. Published Patent Application No. US20100294877A1 ("VTOL Lifting Body Flying Automobile"). One major disadvantage of a lifting body is that it generates significantly less lift than winged aircraft of similar weight, which then leads to other disadvantages such as lower load-carrying capacity, less range, relatively high sink rates and landing speeds, etc., in additional to a propensity to display lateral phugoid modes, all of which led to the Space Shuttle ultimately being provided with wings.

At the other end of the wingless-winged "spectrum" are the so-called "flying wing" aircraft, which have substantially no fuselage and typically no empennage. In service at least since the Northrop XB-35 developed in the 1940's, perhaps the most noteworthy operational flying wing vehicle at present is the American heavy strategic bomber known as the B-2 Spirit. These designs are unsuitable for vehicles that must also operate as land vehicles because of their wingspan, which would be far too great for typical roads; stowing the wings would, moreover, be much more difficult than in the case of vehicles such as the AirCar mentioned above.

Another category of land/air vehicles includes those with solely or primarily vertical thrust designs, in which substantially all thrust is directed perpendicular to the plane of the vehicle's main body. Forward motion is caused by pitching the vehicle downward or installing the forward thrusters with a cant; attitude and altitude are then maintained using differential forward-aft vertical thrust. Lift is thus not generated using an airfoil, but rather altitude is obtained and maintained almost solely though vertical thrust, although the main body may be streamlined or have an approximate airfoil shape to reduce drag. One example of such an arrangement is disclosed in the Chinese patent document CN112406435A, "Flying car based on multistage vector ducted fan". Other examples of vehicles in this category are the Cormorant and X-Hawk, developed by the Israeli company Urban Aeronautics, aspects of which are described in various patent documents, for example, U.S. Pat. No. 7,246,769B2 (Yoeli). One may also put in this category the many "multi-copter" designs, which resemble large versions of recreational drones, albeit with wheels for ground support and to enable them to be rolled, for example into hangars or garages.

One disadvantage of most such solutions is that they are not designed to operate as true land vehicles and are not able to move under their own power and be driven while continuously in contact with a road surface. Another general disadvantage is what happens in the event of a loss of engine power since they are not designed to controllably glide. In essence, most of the known vehicles in this category operate using the same principle and with the same ground limitations as a multi-rotor helicopter.

The Chinese patent document CN 107175999A discloses a "quad-copter" design with propellers whose direction of thrust can be changed from vertical to substantially horizontal using articulation. This reference mentions the presence of an airfoil structure, but the lift-generating efficiency of the disclosed design will necessarily be severely limited not only by the placement of the propellers, but also by the four large propeller apertures in the main body, which will inevitably degrade laminar flow.

DESCRIPTION OF EMBODIMENTS

Figure 1:
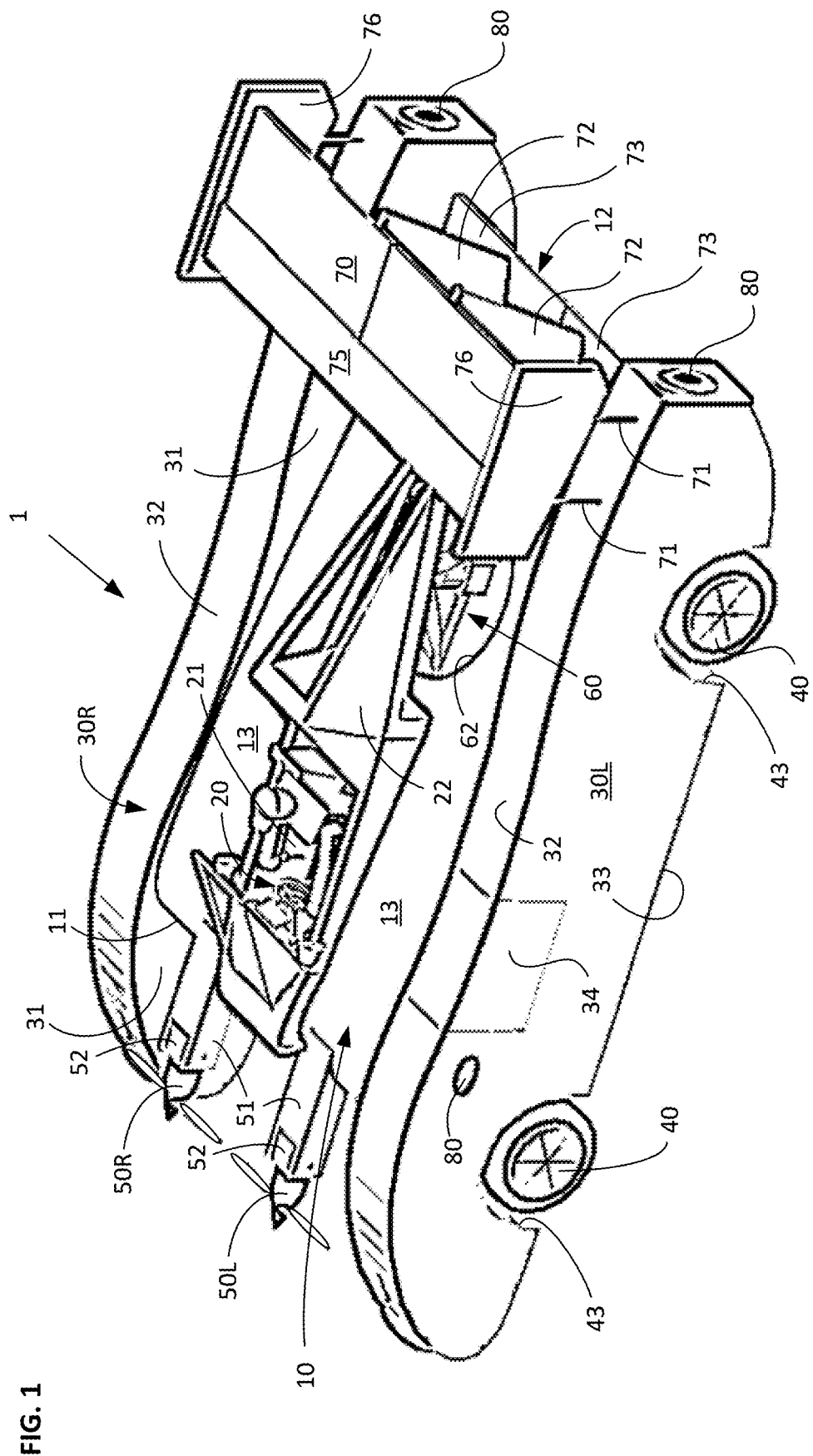
FIG. 1 is a simplified, left rear elevated perspective view of one embodiment of a novel land-air vehicle, referred to for simplicity here by its prototype name Sky Chaser.

In broad terms, different embodiments of the invention provide a wingless, Vertical Takeoff and Landing (VTOL) vehicle that is able to efficiently operate both as an aircraft— in two different modes—and as a land vehicle; in one preferred embodiment, the vehicle is also provided for operation on water as well. The drawings illustrate an initial design of an early prototype of one embodiment and, consequently, illustrate certain features more "roughly" and less streamlined than an actual implementation is expected to be. The drawings are not necessarily to scale.

As the figures illustrate, the Sky Chaser 1 comprises a main body 10, which extends laterally on either side of a central module 20, which comprises a compartment 21 that may form a cockpit for one or more human operators, or a space in which a load may be carried. The load may be a single human operator (as illustrated), multiple operators/passengers (by elongating the central module), or other cargo. The main body 10 has an airfoil shape over portions 13, with a leading edge 11 and a trailing edge 12. Left and right lateral members or sections 30L and 30R (occasionally referred to collectively below by a common reference numeral 30) extend lengthwise on either side of the main body 10, preferably over at least the entire length of the main body, preferably even farther, forward of the thrust systems 50L, 50R, and preferably vertically above and/or below the main body over at least the portion of the main body behind the module 20.

The vehicle is thus not a traditional "lifting body" since it does not have a pronounced, substantially cylindrical fuselage that is shaped to generate lift, and also not as a traditional "flying wing", which substantially removes a fuselage and is configured as two long, extending, tapering wings connected inboard. The various embodiments described here are "wingless" in the sense that there are no such conventional wings, that is, with a high, often above 3:1 or even 10:1 ratio of span to chord length.

In the figure, the inboard surface 31 of each lateral member appears to form a sharp right angle with the upper surface of the main body 10. In general, this will not be so in actual implementations; rather, the transition between the main body 10 and each housing 30 will preferably be smooth, such as by using a fillet or appropriate molding, or simply by appropriate shaping of the housing. The upper surface 32 of each member 30L, 30R is preferably streamlined and may also have at least a partial airfoil profile. The under surface 33 of each lateral member may be shaped to increase the streamlining and airfoil effect, as long as it provides sufficient road clearance when the Sky Chaser is operating as a land vehicle.

In the illustrated embodiment, the Sky Chaser has four wheels 40, two on either side of the vehicle, as in other conventional land vehicles. In preferred embodiments, wheel wells 43 (see also FIG. 6) are formed as indentations/recesses or "cut-outs" in the undersides of the lateral members 30, such that the wheels extend enough vertically below the members 30 to contact a surface (such as a road) under the vehicle when it operates as a land vehicle, but are otherwise mostly out of the airstream of the vehicle when in flight. The outer surfaces of the wheels are preferably flush with the outer surfaces of their respective lateral members 30L or 30R and may be provided with coverings (such as hub caps) to further avoid disruption of smooth airflow around the lateral members.

When the Sky Chaser is in the land-based configuration, the wheels may be engaged. The Sky Chaser may be configured as rear-wheel drive, front-wheel drive, or all-wheel drive, depending on design preferences and allowable weight. In one prototype, the Sky Chaser had rear-wheel drive, with respective independent electric motors for each rear wheel. In such implementations, the necessary battery or batteries will be mounted in suitable housings within either the main body 10, or central module, lateral members 30, or any combination of there, depending on the desired weight-and-balance characteristics of the chosen design. A single motor could also be implemented, although care must then be taken to ensure that components such as an axle, differential, etc., can find room, not weigh too much, and not affect the weight distribution of the vehicle too negatively. Other types of motors may also be used to drive the wheels, including those that combust liquid or gas as fuel.

In an alternative embodiment, the forward propellers 50L, 50R themselves may be used to generate forward thrust even when the vehicle is operating on land, that is, as a car. Differential power to the propellers may then be used to turn the vehicle during on-land operation, or the wheels may be turned, or both, depending on the design. Using the propellers for thrust even on land may eliminate the need for motors to drive the wheels, and thus reduce weight, or both propeller and wheel motor drive may be implemented, depending on the surfaces on which a given implementation of the vehicle is intended to operate.

Any conventional steering mechanism may be used for the front wheels, such as a rack and pinion, a Pitman arm with a crossbar, servo ("fly by wire"), etc. The vehicle operator may then steer using any conventional mechanism such as a wheel or yoke, a joystick with sufficient leverage, or even by means of pedals, with or without hydraulic or electrical actuation. Accelerator and brake pedals are preferably also provided to perform their typical functions.

Similar conventional control mechanisms such as rudder pedals and a joystick, wheel or yoke are included to operate the various flight control surfaces (see below) during in-flight operation, and may in many cases be the same as those used for on-road operation. As one example, for in-flight operation, the operator may be provided with a conventional joystick or yoke/wheel, or with two control sticks, one for the right and one for the left hand, which may then function just like the two sticks on a RC transmitter. The left may for example control throttle and yaw functions, and the right stick may control pitch and roll functions. The connection between the control devices and the actual control surfaces may be direct, via cables or hydraulics, or indirect, via electric actuators.

At least one forward thrust system is installed, preferably extending forward of the leading edge 11 of the main body 10. In one prototype, these systems, shown as 50L and 50R (referenced collectively as 50), respectively, comprise engine-driven propellers, which may be ducted or non-ducted. The engines may be housed within nacelles 51, with one or more common or independent fuel tanks preferably being located either inside the main body 10, in the operator module 20, in the wheel housings 30L, 30R, or in a combination of these. The propeller motors may instead be electric, or powered by any known liquid or gas fuel, including hydrogen fuel cells, in which case the battery bank, cells, etc., may be housed anywhere within the vehicle as needed to meet capacity, safety, and weight-and-balance requirements. The front motors 50L, 50R are preferably counter-rotating so that the net torque will be at least close to zero. The propellers may have fixed or variable pitch.

In most conventional twin-or multi-engine propeller aircraft, the propellers all turn in the same direction, usually clockwise when viewed from the rear of the aircraft. In a counter-rotating installation, the propellers on the right wing turn counter-clockwise while those on the left wing turn clockwise (or vice versa) in order to reduce the asymmetric blade effect ("P factor") resultant torque in case of single-engine failure. Either such method may be employed in embodiments of the invention. The inventor theorizes, however, that counter-rotating propellers may reduce tip vortices and thus decrease induced drag and improve efficiency. This arrangement may also be used.

One advantage of the illustrated arrangement is that the backwash from each propeller will be directed directly and with little disturbance over the respective airfoil portions of the main body 10, thereby improving lift. Tests of one prototype demonstrated that this backwash-induced lift was sufficient to prevent stalling. It would also be possible, however, to implement a single-engine design with the propeller engine extending directly in front of the central module 20, in which case it would be preferable to shape the front of the module so as to direct backwash as smoothly as possible over the main body's starboard and port airfoil sections 13. It would also be possible to use dual, counter-rotating, coaxial propellers in either a single-engine or twin-engine implementation. One advantage is that the propellers may be made small enough so as to avoid any risk of contacting the ground or water (if on-water capability is implemented), and of course twin engines avoid the problem of the single point of failure that a single engine would involve.

A vertical-thrust system 60 is located aft of the module 20. In the illustrated embodiment, and in a working prototype of the invention described below, this system 60 was a single-propeller arrangement mounted in an aperture 62 in the main body. Alternatively, the system 60 could comprise more than one rear thrust device, such as separate propellers driven by separate motors, for example, mounted in respective apertures in the main body, in the aft portions of the lateral members 30L, 30R, etc. Some advantages of the configuration illustrated in the figures are simplicity, minimal weight, no need to ensure equal thrust from different engines in level flight, and minimal disruption of laminar airflow over the airfoil portions 13 of the main body in horizontal flight mode.

This system 60 comprises any mechanism, such as an engine-driven propeller or dual, counter-rotating and coaxial propellers, a ducted or unducted jet or fanjet, etc., which, when powered, generates downward thrust. Note that if the rear power system 60 includes only a single propeller 63 (as illustrated), the motor torque and gyroscopic forces of the spinning propeller may then cause a non-zero net torque on the vehicle when active. One way this can be eliminated or reduced is by tilting the rear motor slightly laterally so as to provide an opposing, compensating torque. Another way is to use two coaxial and counter-rotating propellers to cancel out torque, instead of the single propeller 63. One advantage of the single-propeller 63 configuration, besides simplicity and reduced weight, is that it greatly reduces the possibility of the propeller motor hitting the motor support, since the propeller tips may flex significantly under full power. An advantage of two coaxial, counter-rotating propellers, however, is that this may reduce the rear motor torque and gyroscopic force that might otherwise affect, albeit in most cases only minimally, the ease of control of the Sky Chaser; however, coaxial configurations typically lead to a loss of 25% efficiency or more compared with separate propellers. Whether to configure the vehicle with one or two propellers is a design choice.

The number of blades in the forward propellers 50L, 50L or the rear propeller(s) need not be limited to two, as illustrated, and the number of blades in the forward propellers need not be the same as the number of blades in the rear propeller(s) 63.

When in flight, the Sky Chaser may use conventional control surfaces. In the embodiment illustrated in FIG. 1, these are provided by a dual elevon arrangement, with a lower elevon arrangement on the trailing edge 12 of the main body and another, upper elevon arrangement 70 supported above the aft portion of the main body by struts 71, pylons, or any other conventional structure such as vertical supports 72, which may also be implemented as vertical stabilizers and tail rudders if desired.

Vertical, substantially flat plate-like members 76 are preferably also included, for example, supported by the struts 71, connected to and helping to support a forward section 75 of the upper elevon arrangement. The plate-like members, which extend below the elevon arrangement 70, also act as "winglets" to not only reduce tip vortices, but also to help maintain airflow between them, thereby helping to "channel" air under the elevon arrangement 70, over the lower elevon arrangement 73, and also across the vertical supports 72. This increases efficiency, lift, and control force, while reducing drag.

In other embodiments, only one of the elevon arrangements may be needed and implemented. One advantage of the elevon structure 70 is that it raises these surfaces above any area of non-laminar flow that may arise behind the center module 20; moreover, it may be easily yet securely and stably supported by the wheel housings 30. It would, however, be possible to implement a V-tail elevon structure as long as the structure needed to secure it at the aft of the vehicle is reliably strong enough without adding so much weight as to negatively affect in-flight performance and pitch controllability.

In one embodiment (not shown), the elevated tail structure 70, 71, 72 may be eliminated, with the associated control functions being handled solely by elevon arrangement 73 in the trailing edge 12 of the main body. This would make the vehicle less sensitive to cross-winds. It would also reduce weight aft which of course will improve the thrust-to-weight ratio, but will also be beneficial if a design requires a center of mass farther forward. Without a rudder, a single trailing-edge elevon arrangement would provide surfaces for pitch and roll control; yaw control could be achieved using differential forward engine thrust. To increase pitch and roll effectiveness, it would also be possible to tilt the front motors in horizontal flight, up and down for pitch control, and asymmetrically for roll control. In the event of total front engine failure, yaw control could be carried out using, for example, the known "bank and yank" flying technique.

Other conventional components such as head-and taillights 80 may also be included, as well as position/navigation lights, anti-collision lights, and landing lights as required or desired.

A cowling (not shown) made of any conventional material such as Plexiglas is preferably included to protect the operator against the elements and also to further streamline the lengthwise central section of the vehicle. To help the operator get in and out of the vehicle, a portion 34 of one or both of the housings 30 may optionally be made as hinged, fold-down steps.

In FIG. 1, the propellers 50 point substantially straight forward so as to generate rearward air flow over the airfoil main body 10. This will be the preferred orientation during on-road operation and also in-flight. During on-road operation, however, the propellers could instead be configured to be "stowed" in a horizontal plane (as in the VTOL configuration). The propellers are mounted in such a way that when they are in the substantially vertical plane (for forward thrust), there is sufficient ground or water clearance to avoid them contacting the underlying surface during on-road operation of the vehicle.

Figure 2:
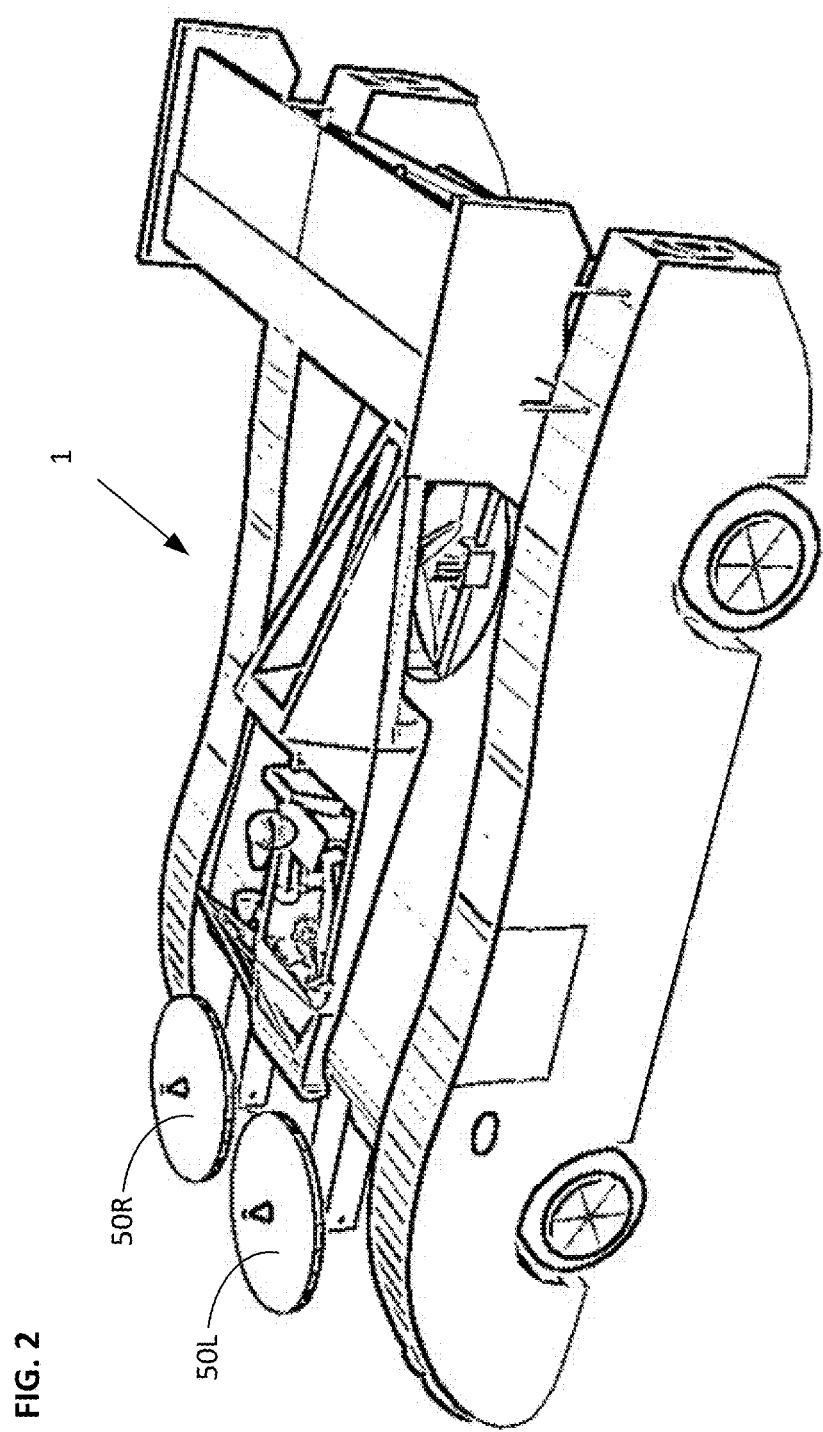
FIG. 2 depicts the Sky Chaser in a VTOL configuration.

Each forward engine is provided with an articulation mechanism 52 that allows the propellers to be rotated upwards (and downward) so that thrust is directed substantially vertically downwards during VTOL operation. This VTOL configuration is illustrated in FIG. 2. In FIG. 2, the propellers are depicted as discs merely to illustrate them as they are spinning. If both the front engines 50 and the rear thruster 60 are powered sufficiently, they will generate vertical thrust greater than the weight of the Sky Chaser and its operator or cargo, thereby enabling VTOL operation. Because the axes of rotation of the three thrusters are at the vertices of a "triangle" (in twin-engine implementations), the Sky Chaser may be maintained in a straight and level position relative to the ground even in changing circumstances by changing the relative forward-aft vertical thrust for pitch control and left-right vertical thrust of the forward propellers for roll control. Positive or negative vertical velocity may of course be controlled by increasing or decreasing power to the three engines.

Transition between the VTOL configuration shown in FIG. 2 and the forward-flight configuration shown in FIG. 1 may be provided by either automatic control, or under the direct manual control of the operator, or both, depending on the preference of the vehicle designer. As with other VTOL propeller aircraft, once the Sky Chaser has reached a preferred initial altitude, it may gradually transition and accelerate into forward flight by rotating the propellers, preferably synchronously, from the vertical-thrust configuration to the forward-thrust configuration, and reducing power to or shutting off the rear motor. As in other VTOL propeller craft, this process is simply reversed for landing.

The Sky Chaser has three main aerodynamic thrust modes:
1) VTOL operation, in which the front engines point upwards and the rear engine is powered, all three creating downward vertical thrust, and the vehicle may be maneuvered by tilting longitudinally to go back and forth, and tilting laterally for roll. In this mode the vehicle uses vertical motor speed/thrust for pitch and roll control. In some embodiments, as needed, known control techniques may be incorporated to provide for autostabilization in this as well as in other of the modes. Moreover, the engines may be tilted asynchronously, which will cause unequal torque that may then be used for yaw control. It would also be possible to control yaw by configuring the rear engine to be able to be tilted laterally, although this will in most cases require unnecessary additional weight and complexity, especially in implementations in which the front engines may be tilted to accomplish this.
2) A horizontal flight mode, in which the front engines are angled to point substantially forward, the rear engine may be disengaged (or operated at less than full power if needed for additional pitch control or stabilization), and the vehicle operates in principle like a conventional aircraft, with lift being generated by air flow over and under an airfoil. In this mode, the vehicle thus uses the control surfaces for control.
3) the transition mode between the VTOL and horizontal modes, in either order. In this mode the vehicle has both VTOL (motor thrust) and control plane (elevons and rudder) mode control. While in the transition mode, the front engines may be rotated either synchronously or asynchronously. The engines may be rotated synchronously to control forward speed, for example, to gradually increase forward speed until the airfoil produces enough lift to enter the horizontal flight mode. The engines may be tilted asynchronously for yaw control.

Figure 3:
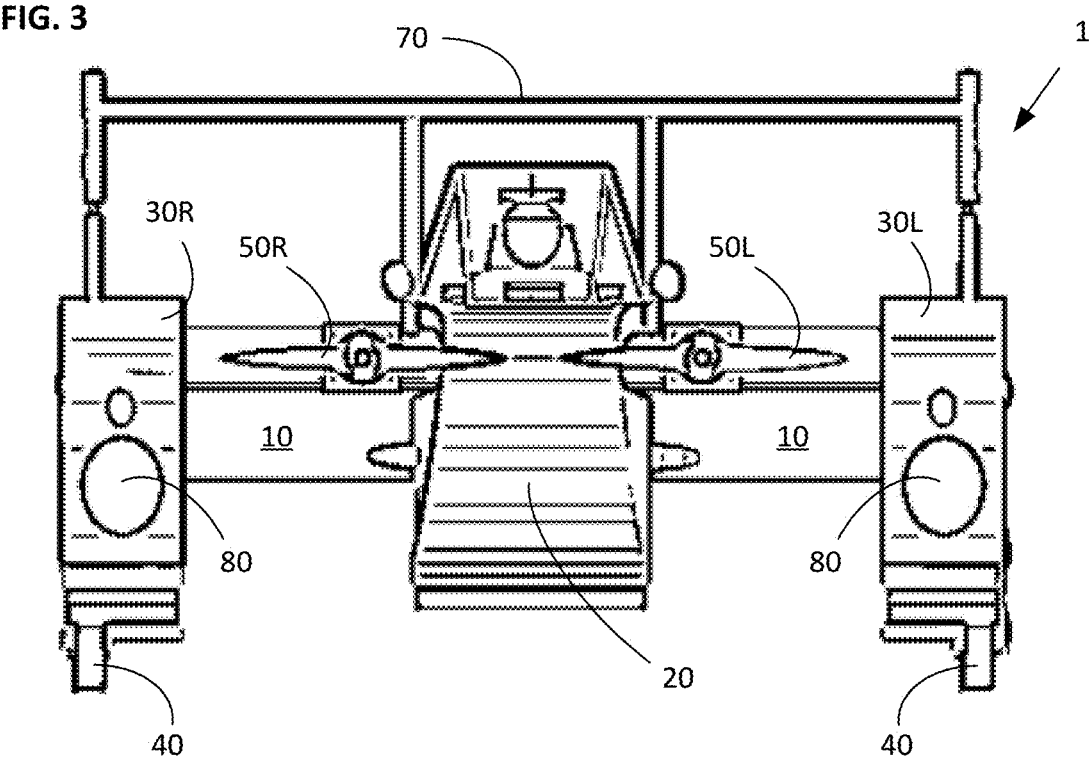
FIGS. 3-6 are, respectively, front, side, top, and bottom views of the Sky Chaser.

FIG. 3 depicts an embodiment of the Sky Chaser from the front. It also shows a novel and particularly advantageous feature of embodiments of the Sky Chaser: the lateral members 30 are also positioned and configured to act as winglets that extend above or below the airfoil surface of the main body/airfoil, or both above and below. Depending on the implemented width and shape of the lateral members 30, they may be formed either as traditional winglets, or any of the known blended winglet designs known variously as a canted winglet, "sharklet", a wingtip fence, etc. As is well known, such wingtip devices and, in this case, the lateral members 30, increase airfoil efficiency by damping vortices and thereby partially recovering tip vortex energy. The configuration in embodiments of this invention also helps channel air flow and thus thrust over and under the airfoil sections 13 of the main body 10. This in turn increases lift and fuel efficiency and thus range.

The channeling by lateral member winglets 30 of the propeller backwash over the airfoil may also reduce and, in some embodiments, may eliminate, any tendency to stall. Moreover, in a ⅙ scale model of the vehicle, especially if the rear wheels were at least temporarily held in place (for example with brakes), the lift generated by the propeller backwash alone was great enough to significantly increase the lift generated over the main body. This enabled the model to take off from the ground or water in the conventional manner (not VTOL) with a take-off roll distance much less than expected.

Figure 4:
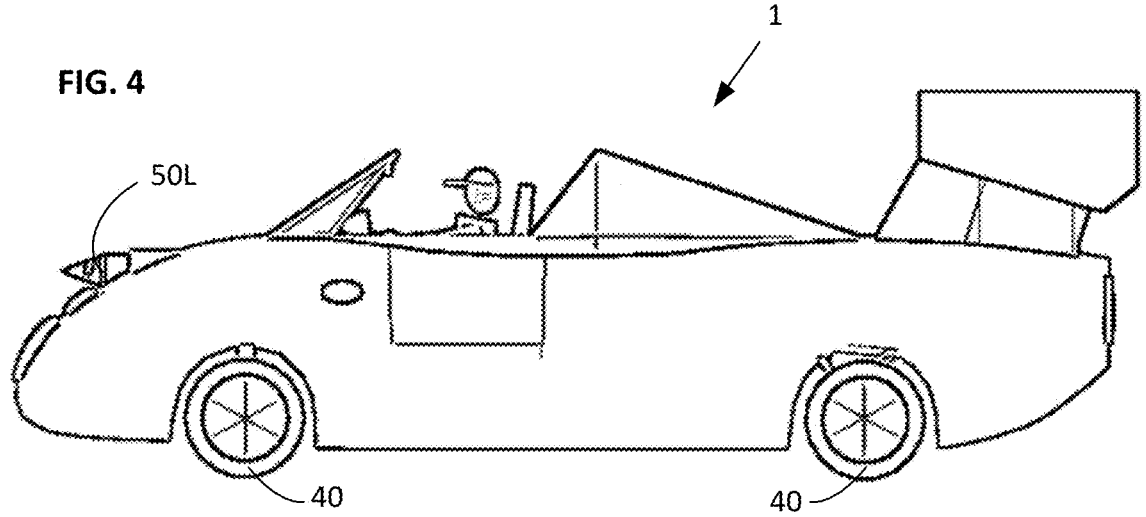

FIG. 4 depicts the Sky Chaser from the side as it might appear while the operator is driving it on a road. The Sky Chaser is suitable for most types of on-road operation either using motor drive for the wheels, or forward propulsion via the forward propellers, or both. Some embodiments may even be suitable for high-speed land operation, including racing. In such high-speed operation, the rear engine and thus direction of rotation or pitch of the propeller 63 may be reversed so as to generate upward thrust so as to press downward on the aft portion of the vehicle to increase traction.

Figure 5:
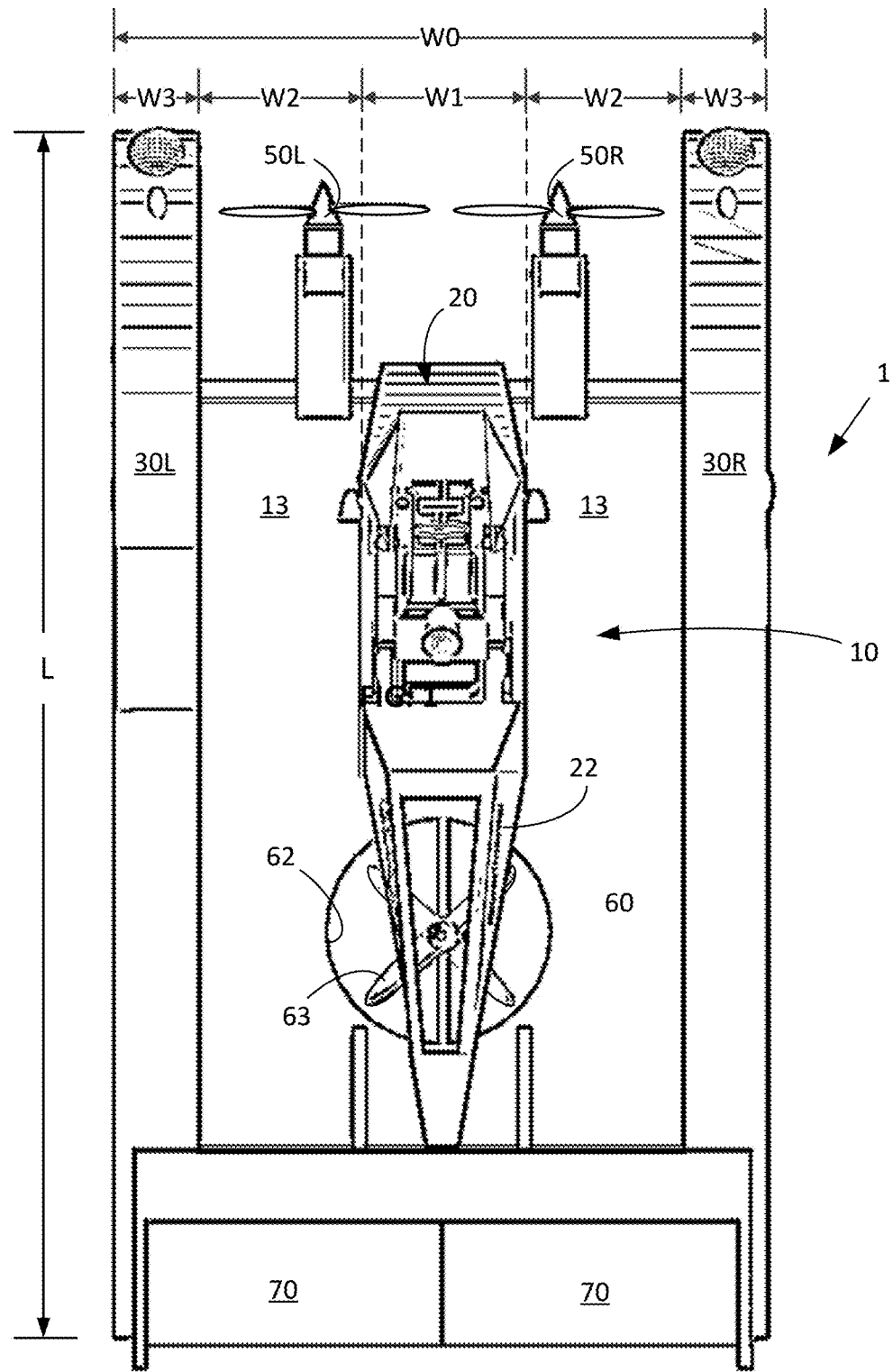

FIG. 5 depicts the Sky Chaser from above and shows, in particular, the position of the rear thruster 60 within the aperture 62. In the illustrated embodiment, the rear, vertical-thrust system uses a four-blade propeller 63, although the number of blades is a design choice.

As mentioned above, it would alternatively be possible to use two coaxial, counter-rotating propellers in the rear thrust system. One advantage of this choice is that it helps reduce rear motor torque and gyroscopic force that might otherwise affect, albeit in most cases only minimally, the ease of control of the Sky Chaser. It would, however, in many cases be sufficient to slightly tilt a single rear propeller laterally so it generates an opposite torque to cancel the motor torque.

Note also that the extension 22 of the module is preferably not totally enclosed, but rather is mostly open so as to allow for a better vertical flow of air to the propeller 63. In some embodiments, the cowling extension 22 may be deleted altogether, such that there is no portion of it over the aperture 62; experiments have indicated that doing so may significantly improve propeller thrust and reduce noise.

Figure 6:
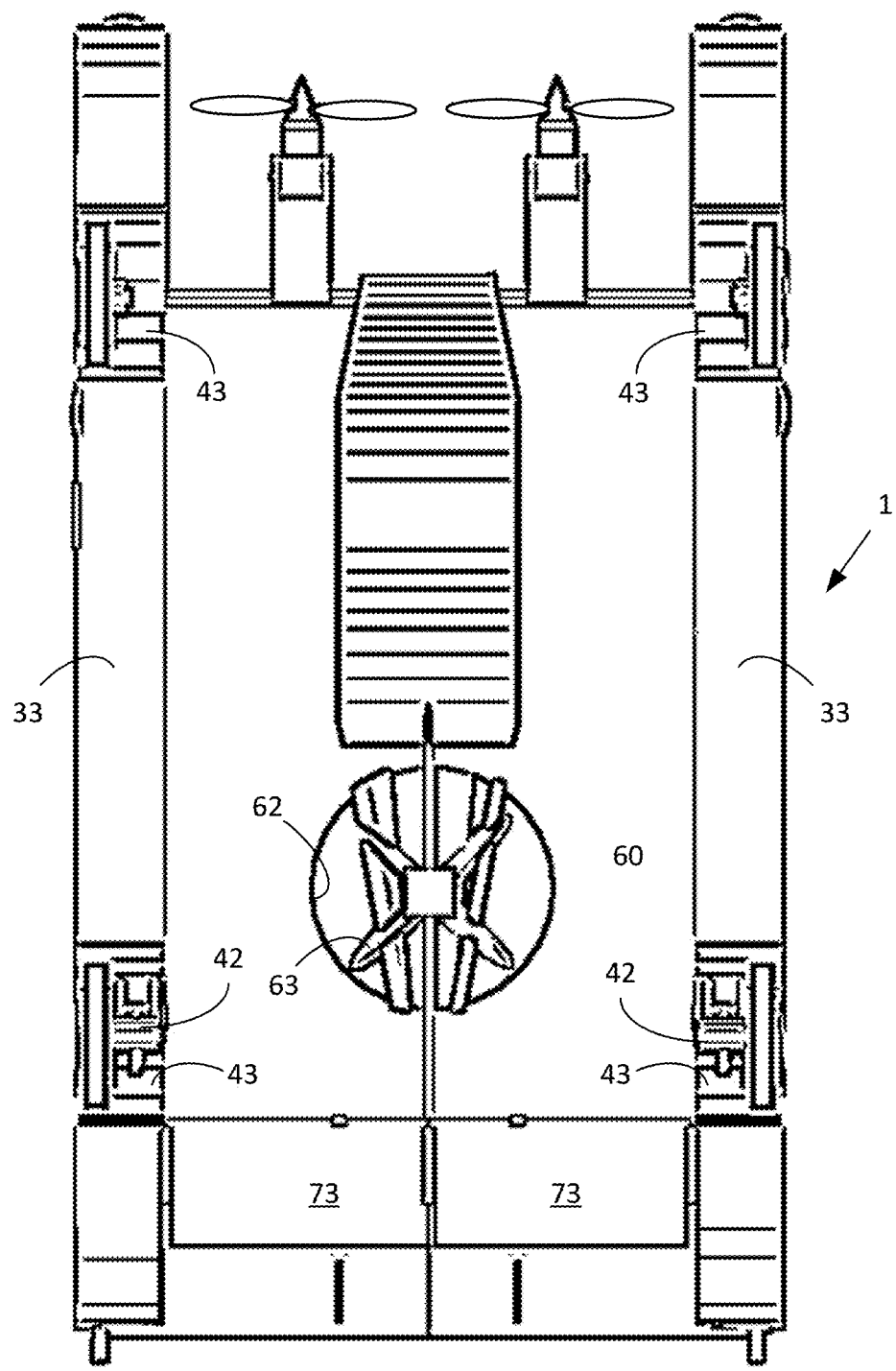

FIG. 6 depicts the Sky Chaser from below. In FIG. 6, the preferably electric motors 42 that drive the rear wheels may be seen. Note also that the wheels themselves within the wheel wells 43 may efficiently be mounted so as to be substantially flush with the outer edge of the housing, thereby reducing drag. The Sky Chaser may also be implemented to provide an optional advantageous feature, namely, amphibious operation. In these embodiments, the lateral members 30, and optionally even the main body 10, are constructed so as to be sealed against water intrusion. One way to accomplish this is to construct the lateral members as hollow, sealed bodies; another way would be to manufacture the lateral members to be filled with a lightweight foam material such as Styrofoam or other closed-cell foam. The main body may optionally also be "waterproofed" using similar methods. The Sky Chaser would be able to take off and land either vertically or horizontally on water. In such case, the motors 42 that power the rear wheels should preferably be either waterproof in and of themselves, or otherwise enclosed within the housing 30, with a wheel shaft that extends to the respective wheel via a waterproof fitting such as a gland.

Once in the water, the engines 50 may be used for forward propulsion. Powering the rear engine 60 may then not be needed, since the lift generated by the airfoil sections will tend to lift the vehicle out of the water, thereby reducing water drag and enabling the vehicle to move forward. The wheels and aircraft rudder(s) may then be used to turn the vehicle in the water, and the elevons may be used to aid in pitch and roll control. The front wheels, or rear wheels, or both, may act as rudders, although it would also be possible to mount a more conventional rudder on the main body, or at the aft end of each lateral member in the manner of sea plane floats or kayaks.

Yet another advantage of the Sky Chaser is that, by avoiding the multiple apertures needed for most multi-copter designs, the airfoil portions 13 of the main body 10, together with the winglet-forming wheel housings 30, may efficiently take advantage of ground effect when in-flight near the ground or over water, which improves the lift-to-drag ratio of the main body and increases range. When in such ground effect mode, the rear thruster 60 could optionally be powered at less than full power to offset any leakage of air that might otherwise occur up through the aperture 62.

Still another advantage of the Sky Chaser is that it is able to glide if forward engines 50 fail. The operator may then pitch the Sky Chaser down to maintain enough airspeed to avoid a stall, and the ability to take advantage of ground effect will then also allow for a smoother flare and landing than otherwise. If the engine failure occurs during VTOL configuration, with the forward engines angled upwards, in some designs in which both forward and aft propellers have variable pitch, it may also be possible to land the vehicle using autorotation.

Dimensions of Prototype

The dimensions of the various structures in embodiments of the vehicle made according to the invention may of course be varied according to the needs of a particular implementation, the type, size, and weight of the load (if any) the vehicle is to carry, the materials used, the type and number of thrust systems including use of single or double counter-rotating propellers, etc. To give a sense of approximate proportions, however, the dimensions of one prototype of one embodiment of the invention will now be given, with the understanding that these may be varied.

The forward propellers 50L, 50R in the prototype were 32 inches (81.28 cm) in diameter and the front vehicle nacelles 51 extended far enough forward of the leading edge 11 that the propellers cleared the leading edge 11 of the main body so as to promote smooth backwash airflow even over the leading edge 11 of the airfoil; this also avoids the thrust pushing the front of the vehicle down and reducing lift. In VTOL mode (plane of propeller rotation substantially horizontal), the propellers were flush with the tip of the lateral members 30L, 30R and flush with the leading edge of the airfoil sections 13. Note that this means that all or almost all of the leading edge of each airfoil section 13 is preferably directly behind some portion of the respective one of the propellers during horizontal flight, such that a large portion of the backwash from each propeller is directed over the respective airfoil section, which increases lift and thus efficiency. Note that this contrasts with conventional fixed-wing aircraft, in which most of the backwash from the forward propulsion systems is "wasted" with respect to lift, except in the sense of providing more forward speed and thus "indirectly" faster airflow over airfoil surfaces.

The diameter of the rear aperture 61 in the prototype was 33 inches (83.82 cm), that is, about one inch (2.54 cm) larger than the diameter of the propeller. This aperture diameter allowed for enough of a gap not to interfere with the flow of downward thrust but not so great that the aperture interferes significantly with laminar airflow over the airfoil of the main body when the vehicle is in horizontal flight.

See FIG. 5. The width W0 of the vehicle prototype was 8 feet (243.84 cm), which was just under the local legal width limit for road vehicles; this also is a width that allows for convenient transportation by truck. For most implementations in which the vehicle is used to transport at least one person, tests indicate that a width W0=8 feet (243.84 cm) is a minimum, although use of lightweight materials such as carbon fiber may allow this to be reduced. With this total width W0, the width W2 of the airfoil regions of the main body were a minimum of 2 feet (60.96 cm), which provided a width W1=2 feet for the cockpit 20 and a width W3=1 foot (30.48 cm) for each lateral member 30L, 30R, which was sufficient to house batteries to power the vehicle, the wheels themselves, and other parts such as shock absorbers, and would also be sufficient to house the wheel motors themselves, and other parts (if included) such as brakes, hydrogen fuel cells (if hydrogen is used as a fuel), etc.

In the prototype, the airfoil portions 13 of the main body were configured as a high-lift, under-cambered AG19 airfoils with an angle of attack of five degrees of the airfoil cord line relative to the ground.

The main body 10 is located high enough in the vehicle that the forward propellers, connected to the main body via the nacelles, have good clearance when on the road or water. Because of the weight of the lateral members, especially if it houses batteries in addition to the wheels, the center of gravity of the vehicle will be located vertically below the airfoil sections 13, which makes the vehicle stable in both VTOL and airplane flight modes.

The lateral members 30L, 30R preferably extend under the main body as well as above it, thereby increasing their "winglet" effect and blocking most of the airflow around the outer edge of the airfoil sections that would otherwise occur because of the higher pressure air under the sections attempting to flow to the lower pressure, upper side. due to high pressure buildup under the airfoil sections, flowing to the low pressure above those section.

In the prototype, at the leading edge 11 of the main body, the lateral members 30L, 30R extended 8 inches (20.32 cm) above the leading edge of each airfoil section 13 and 26 inches (66.04 cm) below the leading edge. At the trailing edge 12, the lateral members 30L, 30R extended 16.5 inches (41.91 cm) above the trailing edge of each airfoil section 13 and 15 inches (38.10 cm) below the trailing edge. As the thickest point, each airfoil section 13 was 8 inches (20.32 cm) thick.

The lateral members 30L, 30R in the prototype extended 32 inches (81.28 cm) forward of the leading edge 11, which was 14 inches (35.56 cm) forward of the front of the nacelles 15. Combined with the extended front motors, this provides a large crumple zone, greatly increasing safety in head-on crashes.

"Jumping" VTOL

The "vertical" modifier in the concept of "VTOL" need not be restricted to mean that the main body 10 takes off and lands, and transitions to and from horizontal flight mode, parallel to the underlying surface, whether this be land or water. An alternative embodiment of the invention implements what can be called a "jump" take-off and landing, substantially directly vertical, but without the main body maintaining an orientation parallel to the underlying surface. In this "jumping" embodiment, the rear engine arrangement 60 may be deleted; alternatively, depending on the implemented power-to-weight ratio of the vehicle, "jumping" may be used in case of failure of the rear thrust system 60. In this embodiment, on take-off, the forward thrust systems 50L, 50R are pointed upward, for example, straight up, and are powered up sufficiently to lift the front end of the vehicle. The power to the forward thrust systems is then increased and they are then quickly transitioned to the forward flying position. This substantially "drags" the vehicle far enough into the air that it will leave the ground (or water) enough to allow for the thrust transition. Recall that, depending on the weight of the chosen implementation, the air flow over the airfoil sections 13 generated by the backwash from the forward thrust systems may generate enough lift to maintain the vehicle above the underlying surface as it transitions to forward flight.

To land in the "jumping" embodiment, this process may be reversed. As needed, skid plates or other protective devices may be included in the rear portion of the lateral members 30 to absorb the force and abrasion as when the rear of the vehicle first touches down.

Configurations

As the description above makes clear, the vehicle has several different possible configurations. The main modes/capabilities (and related structures) are:

V: vertical flight (VTOL), thanks to the articulating forward engines plus (except for the "jumping" embodiment) the rear thrust system;

A: "airplane mode", that is, horizontal flight, thanks to the forward thrust systems and the wingless main body design, made more efficient by the winglet function of the lateral members;

C: "car mode", that is, the ability to operate as a land vehicle thanks to the steerable wheels; and W: "water mode", that is, the ability to take off from, land on, and maneuver on, water, in embodiments in which the lateral members are sealed against water ingress.

Some of these modes are optional, such that there may be different combinations. For example, the full configuration would have all four modes and structures V+A+C+W. Other embodiments may not need water capability, and thus would be built with the structures enabling only V+A+C. Still others may not need to operate on land at all, and could be built with the structures enabling V+A+W. Yet other possible constructions would need the structures only for A+V or only A+C, that is, a vehicle that can fly like an airplane, plus either VTOL capability, or operation as a car, but not both.

What is claimed is:

1. A vertical take-off and landing (VTOL) vehicle comprising:
   a main body including airfoil sections on either side of a central module;
   said central module being positioned laterally centrally in the main body, for holding a load;
   a pair of propellers mounted on respective nacelles extending forward of a leading edge of the main body;
   lateral members located on either side of the main body outboard of the airfoil sections and forming winglets;
   steerable wheels mounted substantially within respective recesses forming wheel wells in the lateral members, whereby the vehicle may be steered when operating as a land vehicle;
   said propellers being articulated so as to be able to transition between a vertical flight configuration and a horizontal flight configuration, such that, in the a vertical flight configuration, thrust from the propellers is directed primarily downward and, in the horizontal flight configuration, the vehicle is configured to operate at an altitude above ground effect and thrust from the propellers is directed primarily horizontally both over and under the airfoil-shaped main body, backwash from the propellers being directed over substantially the entire width of the airfoil sections;
   said lateral members extending longitudinally forward of the leading edge of the main body, over the length of the airfoil sections and above and below the respective airfoil section, thereby being configured as both vortex-damping members and also to channel backwash from the propellers over the airfoil formed by the main body; and
   said airfoil sections having a substantially continuous, uninterrupted surface longitudinally from the leading edge to a trailing edge of the main body;
   in which:
   a total width of the vehicle is at most 8 feet and the width of the airfoil sections is a minimum of 2 feet each, and when the propellers are in the horizontal flight configuration, the propellers have ground clearance, whereby the propellers can provide forward thrust when the vehicle is operating as a land vehicle.

2. The vehicle of claim 1, further comprising at least one rear vertical-thrust system whereby, in the vertical flight configuration, thrust from the rear vertical-thrust system is directed primarily downward.

3. The vehicle of claim 2, in which the rear vertical-thrust system comprises at least one propeller.

4. The vehicle of claim 2, in which the at least one rear vertical-thrust system comprises a single thrust arrangement mounted within an aperture in the main body, laterally centered and located aft of the central module.

5. The vehicle of claim 4, in which the single rear vertical thrust arrangement comprises at least one propeller.

6. The vehicle of claim 1, in which the load is at least one human.

7. The vehicle of claim 1, further including at least one rear elevon arrangement.

8. The vehicle of claim 7, including both an upper and a lower elevon arrangement, said lower elevon arrangement positioned at and forming the trailing end of the main body.

9. The vehicle of claim 8, further comprising vertical supports supporting the upper elevon arrangement above the main body.

10. The vehicle of claim 8, further comprising vertical plate-like members supported outboard of the upper elevon arrangement forming winglets for the upper elevon arrangement and channeling air flow both under the upper elevon arrangement and over the lower elevon arrangement.

* * * * *